US007962581B2

(12) United States Patent
Bodin et al.

(10) Patent No.: US 7,962,581 B2
(45) Date of Patent: Jun. 14, 2011

(54) CLIENT DEVICE CONFIGURATION WITH VENDOR ASSOCIATION OF CONFIGURATION PARAMETERS

(75) Inventors: William Kress Bodin, Austin, TX (US); Michael John Burkhart, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 971 days.

(21) Appl. No.: 10/317,993

(22) Filed: Dec. 12, 2002

(65) Prior Publication Data

US 2004/0117465 A1    Jun. 17, 2004

(51) Int. Cl.
    *G06F 15/177*    (2006.01)
(52) U.S. Cl. .................. 709/220; 709/222; 709/228
(58) Field of Classification Search .................. 709/220, 709/222–223, 203, 217, 219, 228; 705/27; 717/168, 174

See application file for complete search history.

(56) References Cited

U.S. PATENT DOCUMENTS

| | | | | |
|---|---|---|---|---|
| 5,826,000 | A | | 10/1998 | Hamilton ............... 395/182.02 |
| 5,852,722 | A | * | 12/1998 | Hamilton .................. 709/221 |
| 5,870,610 | A | | 2/1999 | Beyda ..................... 395/712 |
| 6,012,088 | A | | 1/2000 | Li et al. .................. 709/219 |
| 6,128,729 | A | | 10/2000 | Kimball et al. ............... 713/1 |
| 6,182,275 | B1 | * | 1/2001 | Beelitz et al. .............. 717/175 |
| 6,263,387 | B1 | | 7/2001 | Chrabaszcz ................ 710/103 |
| 6,286,038 | B1 | | 9/2001 | Reichmeyer et al. ........ 709/220 |
| 6,301,012 | B1 | | 10/2001 | White et al. ............... 358/1.15 |
| 6,314,459 | B1 | | 11/2001 | Freeman .................... 709/220 |
| 6,336,152 | B1 | | 1/2002 | Richman et al. ............. 710/8 |
| 6,745,239 | B1 | * | 6/2004 | Hubbard .................... 709/220 |
| 6,760,708 | B1 | * | 7/2004 | Hubbard et al. ............... 705/27 |
| 6,766,364 | B2 | * | 7/2004 | Moyer et al. ............... 709/221 |
| 6,912,552 | B2 | * | 6/2005 | Hubbard et al. ............. 707/204 |
| 6,985,876 | B1 | * | 1/2006 | Lee ........................ 705/27 |
| 2002/0026504 | A1 | | 2/2002 | Lo ......................... 709/220 |
| 2002/0035621 | A1 | | 3/2002 | Zintel et al. ............... 709/220 |
| 2002/0069257 | A1 | * | 6/2002 | Rigori et al. .............. 709/217 |
| 2002/0078367 | A1 | | 6/2002 | Lang et al. ................. 713/200 |
| 2002/0108002 | A1 | | 8/2002 | Gifford et al. .............. 710/36 |
| 2003/0135596 | A1 | * | 7/2003 | Moyer et al. ............... 709/223 |
| 2003/0200285 | A1 | * | 10/2003 | Hansen et al. .............. 709/220 |
| 2007/0299944 | A1 | * | 12/2007 | Bodin et al. ............... 709/222 |
| 2008/0320114 | A1 | * | 12/2008 | Bodin et al. ............... 709/220 |

FOREIGN PATENT DOCUMENTS

| | | |
|---|---|---|
| KR | 1997-7650 | 2/1997 |
| KR | 2001-3851 | 5/2001 |
| KR | 2001-38516 | 5/2001 |

OTHER PUBLICATIONS

Crayford, Ian; '"Fast Ethernet" Gets Plug-and-Play'; IEEE, 1995; pp. 354-359.
Velayos, Hector, et al.; 'Requiremetns for Network Services in BRAIN Project'.
McAuley, A.J., et al.; 'Self-Configuring Networks;' IEEE, 2000; pp. 315-319.
IBM Technical Disclosure Bulletin; 'Automatic Configuration of a Personal Computer System;' Sep. 1989; vol. 32, No. 48; pp. 112-115.
'Cisco Long-Reach Ethernet Solution;' Cisco Product Catalog; Sep. 2002.
Haberman, Brian; 'Home Networking with IPv6;' Oct. 19, 2000.

* cited by examiner

*Primary Examiner* — Lashonda T Jacobs
(74) *Attorney, Agent, or Firm* — Biggers & Ohanian, PLLC

(57) ABSTRACT

Configuring a client device, including receiving, at a vendor, user provided configuration parameters for the client device from a user, receiving at the vendor, a configuration bundle for the client device from a manufacturer, and associating the user provided configuration parameters for the client device with the configuration bundle for the client device, thereby producing an associated configuration bundle.

33 Claims, 5 Drawing Sheets

CLIENT DEVICE CONFIGURATION WITH VENDOR ASSOCIATION OF CONFIGURATION PARAMETERS

BACKGROUND OF THE INVENTION

1. Field of the Invention

The field of the invention is data processing, or, more specifically, methods, systems, and products for configuring client devices.

2. Description of Related Art

Often when a networked client device is purchased and installed onto a network, such as a home network, the client device must be configured to operate properly. When disparate client devices using different protocols are networked together configuring these client devices often requires configuration parameters specific to the user, the network on which the client device will operate, and the client device. Current configuration techniques are often tedious and require extensive user involvement. In fact, in some complicated environments, configuration requires a truck roll with a technical installer. Many conventional configuration techniques require the user to access complicated text instructions from a home computer and wade through large amounts of technical data in order to complete the configuration process. Therefore, there is a need for an improved method of configuring a client device.

SUMMARY OF THE INVENTION

Exemplary embodiments for the invention include methods for configuring a client device. Exemplary embodiments include receiving, at a vendor, user provided configuration parameters for the client device from a user, and receiving at the vendor, a configuration bundle for the client device from a manufacturer. Such embodiments include associating the user provided configuration parameters for the client device with the configuration bundle for the client device, thereby producing an associated configuration bundle.

Exemplary embodiments of the invention include downloading the associated configuration bundle for the client device to a services gateway for the user. In such embodiments, downloading the associated configuration bundle for the client device to a services gateway for the user includes pushing the associated configuration bundle to the services gateway for the user. Typical embodiments include executing the associated configuration bundle.

Exemplary embodiments of the invention include detecting a client device. Such embodiments include requesting an associated configuration bundle for the client device. In typical embodiments, receiving, at a vendor, user provided configuration parameters for the client device from a user includes storing the user provided configuration parameters in a database.

In exemplary embodiments of the invention, receiving, at the vendor, a configuration bundle for the client device from a manufacturer includes storing the configuration bundle in a database. In such embodiments, the database is indexed according to a client device identifier. In typical embodiments, associating the user provided configuration parameters for the client device with the configuration bundle for the client device includes retrieving the configuration bundle from a database in dependence upon a client device identifier. In exemplary embodiments, associating the user provided configuration parameters for the client device with the configuration bundle for the client device includes retrieving user provided configuration parameters from a database in dependence upon a user identifier.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

Figure 1:
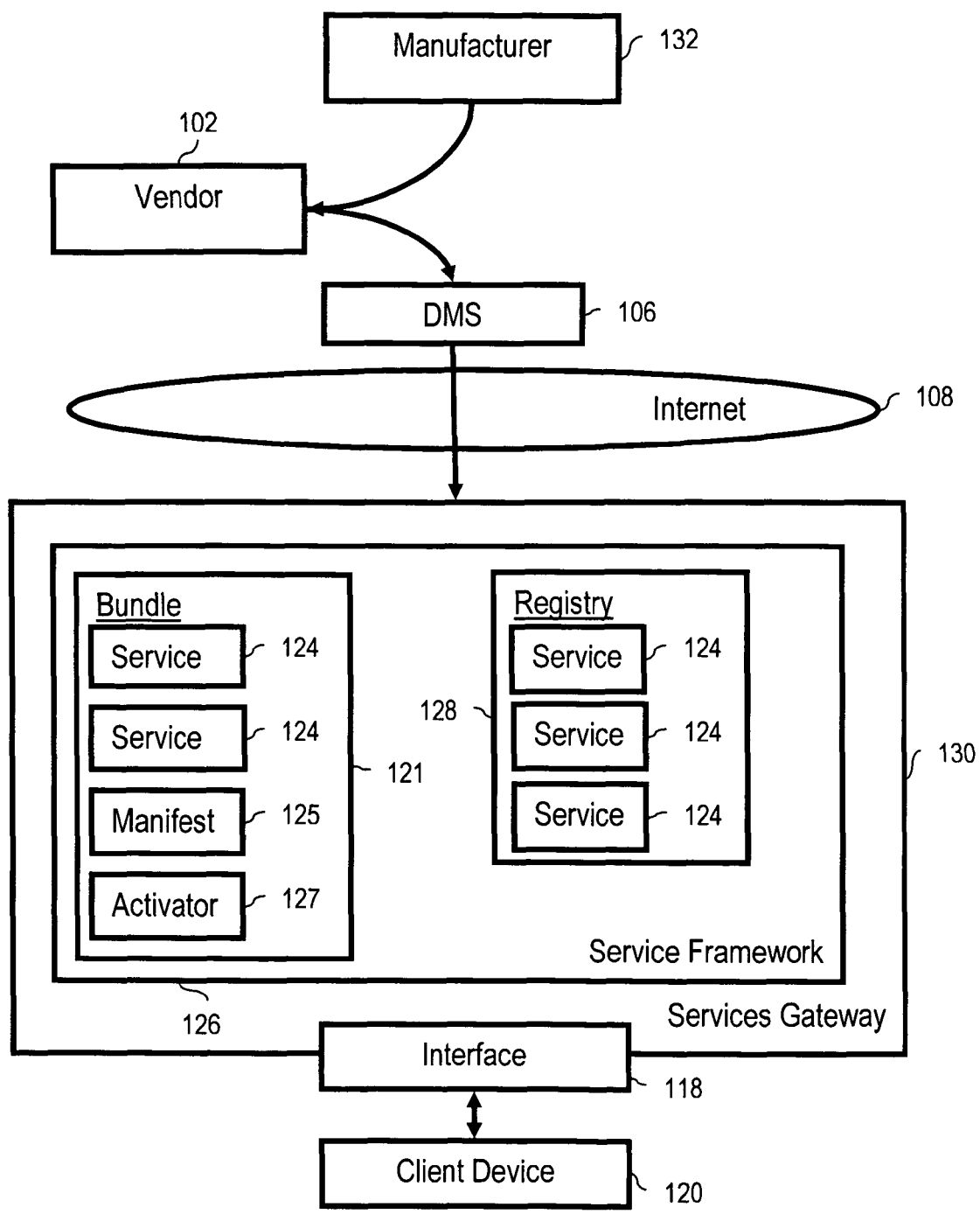
FIG. 1 is a block diagram illustrating information handling architecture and various entities useful in implementing methods of configuring a client device in accordance with methods of the present invention.

The present invention is described to a large extent in this specification in terms of methods for configuring a client device. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

DEFINITIONS

"Field"—In this specification, the terms "field" and "data element," unless the context indicates otherwise, generally are used as synonyms, referring to individual elements of digital data. Aggregates of data elements are referred to as "records" or "data structures." Aggregates of records are referred to as "tables" or "files." Aggregates of files or tables are referred to as "databases." Complex data structures that include member methods, functions, or software routines as well as data elements are referred to as "classes." Instances of classes are referred to as "objects" or "class objects."

"802.11" refers to a family of specifications developed by the IEEE for wireless LAN technology. 802.11 specifies an over-the-air interface between a wireless client and a base station or between two wireless clients.

"API" is an abbreviation for "application programming interface." An API is a set of routines, protocols, and tools for building software applications.

"Bluetooth" refers to an industrial specification for a short-range radio technology for RF couplings among client devices and between client devices and resources on a LAN or other network. An administrative body called the Bluetooth Special Interest Group tests and qualifies devices as Bluetooth compliant. The Bluetooth specification consists of a 'Foundation Core,' which provides design specifications, and a 'Foundation Profile,' which provides interoperability guidelines.

"Browser" means a web browser, a communications application for locating and displaying web pages. Browsers typically comprise a markup language interpreter, web page display routines, and an HTTP communications client. Typical browsers today can display text, graphics, audio and video. Browsers are operative in web-enabled devices, including wireless web-enabled devices. Browsers in wireless web-enabled devices often are downsized browsers called "microbrowsers." Microbrowsers in wireless web-enabled devices often support markup languages other than HTML, including for example, WML, the Wireless Markup Language.

"Coupled for data communications" means any form of data communications, wireless, 802.11b, Bluetooth, infrared, radio, internet protocols, HTTP protocols, email protocols, networked, direct connections, dedicated phone lines, dial-ups, serial connections with RS-232 (EIA232) or Universal Serial Buses, hard-wired parallel port connections, network connections according to the Power Line Protocol, and other forms of connection for data communications as will occur to those of skill in the art. Couplings for data communications include networked couplings for data communications. Examples of networks useful with various embodiments of the invention include cable networks, intranets, extranets, internets, local area networks, wide area networks, and other network arrangements as will occur to those of skill in the art. The use of any networked coupling among television channels, cable channels, video providers, telecommunications sources, and the like, is well within the scope of the present invention.

"Driver" means a program that controls a device. A device (printer, disk drive, keyboard) typically has a driver. A driver acts as translator between the device and software programs that use the device. Each device has a set of specialized commands that its driver knows. Software programs generally access devices by using generic commands. The driver, therefore, accepts generic commands from a program and then translates them into specialized commands for the device.

"HAVi" stands for 'Home Audio Video interoperability,' the name of a vendor-neutral audio-video standard particularly for home entertainment environments. HAVi allows different home entertainment and communication devices (such as VCRs, televisions, stereos, security systems, and video monitors) to be networked together and controlled from one primary device, such as a PC or television. Using IEEE 1394, the 'Firewire' specification, as the interconnection medium, HAVi allows products from different vendors to comply with one another based on defined connection and communication protocols and APIs. Services provided by HAVi's distributed application system include an addressing scheme and message transfer, lookup for discovering resources, posting and receiving local or remote events, and streaming and controlling isochronous data streams.

"HomePlug" stands for The HomePlug Powerline Alliance. HomePlug is a not-for-profit corporation formed to provide a forum for the creation of open specifications for high speed home powerline networking products and services. The HomePlug specification is designed for delivery of Internet communications and multimedia to homes through the home power outlet using powerline networking standards.

"ID" abbreviates "identification," meaning 'identification code' or identification field. It is a style of reference in this disclosure to refer to user identification codes as "user IDs." By convention in this disclosure, the field name "UserID" is used to store a user ID.

"IEEE 1394" is an external bus standard that supports data transfer rates of up to 400 Mbps (400 million bits per second). Products supporting the 1394 standard go under different names, depending on the company. Apple, which originally developed IEEE 1394, uses the trademarked name "FireWire." Other companies use other names, such as i.link and Lynx, to describe their 1394 products.

A single 1394 port can be used to connect up 63 external devices. In addition to high speed, 1394 also supports isochronous data—delivering data at a guaranteed rate. This makes it ideal for devices that need to transfer high levels of data in real-time, such as video.

"The Internet" is a global network connecting millions of computers utilizing the 'internet protocol' or 'IP' as the network layer of their networking protocol stacks. The Internet is decentralized by design. Each computer on the Internet is independent. Operators for each computer on the Internet can choose which Internet services to use and which local services to make available to the global Internet community. There are a variety of ways to access the Internet. Many online services, such as America Online, offer access to some Internet services. It is also possible to gain access through a commercial Internet Service Provider (ISP). An "internet" (uncapitalized) is any network using IP as the network layer in its network protocol stack.

'IP' refers to the 'internet protocol,' a network-layer networking protocol for computer data communications.

"IP address" means an identifier for a computer or device on an IP network. Networks using the IP protocol route messages based on the IP address of the destination. The format of an IP address is a 32-bit numeric address written as four numbers separated by periods. Each number can be zero to 255. An example of an IP address is 1.160.10.240.

"ISP" means "Internet Service Provider," a company that provides access to the Internet. For a monthly fee, an ISP provides a user identification code (often called a 'username'), a password, and an access phone number or, for wide band services, an internet protocol address, through which to access the Internet. Equipped with proper couplings for data communications, such as a modem or cable modem, users and companies can then log on to the Internet, browse the World Wide Web, and access other Internet related services such as USENET and e-mail. In servings companies, ISPs also provide a direct connection from the company's networks to the Internet.

"JAR" is an abbreviation for 'Java archive.' JAR is a file format used to bundle components used by a Java applet. JAR files simplify downloading applets, because many components (.class files, images, sounds, etc.) can be packaged into a single file. JAR also supports data compression, which further decreases download times. By convention, JAR files end with a '.jar' extension.

"JES" stands for Java Embedded Server. JES is a commercial implementation of OSGi that provides a framework for development, deployment, and installation of applications and services to embedded devices.

"LAN" is an abbreviation for "local area network." A LAN is a computer network that spans a relatively small area. Many LANs are confined to a single building or group of buildings. However, one LAN can be connected to other LANs over any distance via telephone lines and radio waves. A system of LANs connected in this way is called a wide-area network (WAN). The Internet is an example of a WAN.

"OSGI" refers to the Open Services Gateway Initiative, an industry organization developing specifications for services gateways, including specifications for delivery of service bundles, software middleware providing compliant data communications and services through services gateways. The Open Services Gateway specification is a Java based application layer framework that gives service providers, network operator device makers, and appliance manufacturer's vendor neutral application and device layer APIs and functions.

"Server" in this specification refers to a computer or device comprising automated computing machinery on a network that manages resources and requests for access to resources. A "web server," or "HTTP server," in particular is a server that communicates with browsers by means of HTTP in order to manage and make available to networked computers documents in markup languages like HTML, digital objects, and other resources. A "DMS server," in particular is a server that communicates with services gateways to provide service bundles to the services gateways.

"SMF" stands for "Service Management Framework™" available from IBM®. SMF is a standards-based architecture that is designed to be compliant with specifications developed by the cross-industry Open Services Gateway Initiative (OSGi). SMF is a commercial implementation of OSGi for management of network delivered applications on services gateways.

'TCP' refers to the 'Transmission Control Protocol,' a transport-layer networking protocol for networked computer data communications. TCP provides a so-called 'reliable' communications protocol in which a message is broken into packets which are communicated to the message's destination and reassembled into the message completely and in correct sequence. TCP is so often used with IP as its underlying network protocol layer that the two are often spoken of together as the TCP/IP protocol suite.

"TCP/IP" means the Transmission Control Protocol (TCP) and the Internet Protocol (IP) operating together. TCP/IP is a packet switching protocol suite. TCP establishes a virtual connection between a data source and a data destination. IP specifies that data will be sent from the source to the destination in packets and IP specifies the addressing scheme of the source and the destination. TCP monitors the delivery of the data and the order in which the packets are delivered.

"USB" is an abbreviation for "universal serial bus." USB is an external bus standard that supports data transfer rates of 12 Mbps. A single USB port can be used to connect up to 127 peripheral devices, such as mice, modems, and keyboards. USB also supports Plug-and-Play installation and hot plugging.

"WAP" refers to the Wireless Application Protocol, a protocol for use with handheld wireless devices. Examples of wireless devices useful with WAP include mobile phones, pagers, two-way radios, and hand-held computers. WAP supports many wireless networks, and WAP is supported by many operating systems. Operating systems specifically engineered for handheld devices include PalmOS, EPOC, Windows CE, FLEXOS, OS/9, and JavaOS. WAP devices that use displays and access the Internet run "microbrowsers." The microbrowsers use small file sizes that can accommodate the low memory constraints of handheld devices and the low-bandwidth constraints of wireless networks.

"World Wide Web," or more simply "the web," refers to a system of internet protocol ("IP") servers that support specially formatted documents, documents formatted in markup languages such as HTML (HyperText Markup Language), XML (eXtensible Markup Language), WML (Wireless Markup Language), or HDML (Handheld Device Markup Language). The term "Web" is used in this specification also to refer to any server or connected group or interconnected groups of servers that implement a hyperlinking protocol, such as HTTP (HyperText Transfer Protocol) or WAP (Wireless Access Protocol), in support of URIs and documents in markup languages, regardless of whether such servers or groups of servers are coupled to the World Wide Web as such.

DETAILED DESCRIPTION

FIG. 1 is a block diagram illustrating an exemplary information handling architecture and various entities useful in implementing methods of configuring a client device in accordance with various embodiments of the present invention. The exemplary architecture of FIG. 1 includes a client device (120) to be configured. A client device (120) can be any configurable device, although in many typical embodiments of the present invention, client devices (120) are devices capable of being networked on a LAN, such as a home network, or any other network as will occur to those of skill in the art. Examples of client devices (120) to be configured include printers, a dishwasher, a DVD player, a coffeepot, or any other device that will occur to those of skill in the art.

In the exemplary architecture of FIG. 1, a client device (120) is coupled for data communication with a services gateway (130). The services gateway (130) is coupled for data communication with the internet (108). The services gateway (130) provides access for the client device (120), and any LAN on which the client device (1020 is operating, to a WAN such as the Internet.

A services gateway (130) is, in some exemplary architectures, an OSGi compatible services gateway (130). While exemplary embodiments of methods for configuring a client device are described in this specification using OSGi, many other applications and frameworks, will work to implement the methods of configuring a client device according to the present invention, and are therefore, also well within the scope of the present invention. Commercial implementations of OSGi, such as JES and SMF, are also useful in implementing methods of the present invention.

OSGi Stands for 'Open Services Gateway Initiative.' The OSGi specification is a Java based application layer framework that provides vendor neutral application and device layer APIs and functions for various devices using arbitrary communication protocols operating in networks in homes, cars, and other environments. OSGi works with a variety of networking technologies like Ethernet, Bluetooth, the 'Home, Audio and Video Interoperability standard' (HAVi), IEEE 1394, Universal Serial Bus (USB), WAP, and powerline communication systems, including the Home Powerline Alliance standard known as HomePlug. The OSGi specification is available for free download from the OSGi website at www.osgi.org.

The services gateway of FIG. 1 includes a service framework (126). In many example embodiments the service framework is an OSGi service framework (126). An OSGi service framework (126) is written in Java and therefore, typically runs on a Java Virtual Machine (JVM). In OSGi, the service framework (126) of FIG. 1 is a hosting platform for running 'services' (124). The term 'service' or 'services' in this disclosure, depending on context, generally refers to OSGi-compliant services.

Services (124) are the main building blocks for creating applications in the OSGi. A service (124) is a group of Java classes and interfaces that implement a certain feature. The OSGi specification provides a number of standard services. For example, OSGi provides a standard HTTP service that creates a web server that can respond to requests from HTTP clients.

OSGi also provides a set of standard services called the Device Access Specification. The Device Access Specification ("DAS") provides services to identify a device connected to the services gateway, search for a driver for that device, and install the driver for the device.

Services (124) in OSGi are packaged with other files, images, and resources that the services (124) need for execution in a 'bundle,' such as the bundle (121) of FIG. 1. A bundle (121) is a Java archive (JAR) file including one or more services (124), an activator class (127), and a manifest file (125). An activator class (127) is a Java class that the service framework (126) uses to start and stop a bundle. A manifest file (125) is a standard text file that describes the contents of the bundle (121).

The services framework (126) in OSGi also includes a service registry (128). The service registry (128) includes the service's name and an instance of a class that implements the service for each bundle (121) installed on the framework (126) and registered with the service registry (128). A bundle (121) may request services that are not included in the bundle (121), but are registered on the framework service registry (128). To find a service, a bundle (121) performs a query on the framework's service registry (128).

The exemplary entities of FIG. 1 include a Device Management Server ('DMS') (106) coupled for data communications with the services gateway (130) though the internet (108), the World Wide Web, or any WAN. The DMS is a server specifically designed to provide, retrieve, or otherwise deploy bundles to the services gateway (130). In many typical examples, a DMS agent provides protocols for receiving requests for bundles from a gateway, authenticating the gateway, retrieving a requested bundle, and providing the requested bundle to the services gateway.

The exemplary entities of FIG. 1 include a vendor (102). The vendor (102) sells or otherwise provides client devices (120) to the user. In examples of methods of configuring a client device, the vendor (102) also sells or otherwise provides to a user configuration bundles for the client device. In some example embodiments of the present invention, the vendor obtains the configuration bundles form a manufacturer of configuration bundles (132).

Figure 2:
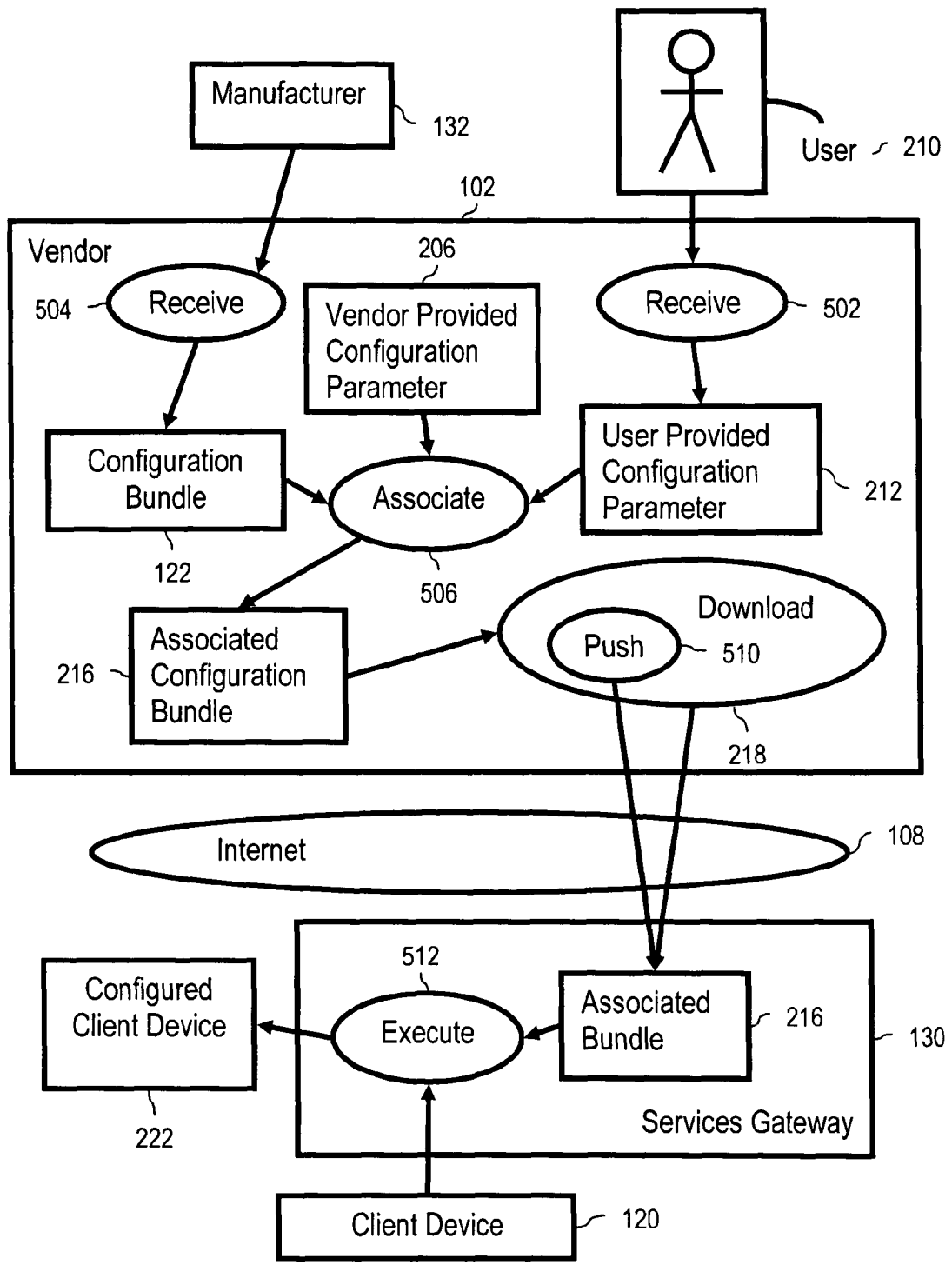
FIG. 2 is a dataflow diagram illustrating an exemplary method of configuring a client device.

The exemplary entities of FIG. 1 also include a manufacturer (132). The manufacturer (132) of FIG. 1 is a manufacturer of configuration bundles for use with methods of configuring a client device (120) according to the present invention. The manufacturer (132) of configuration bundles for the client device is in some instances the manufacturer of the client device (120) itself. However, the manufacturer (132) of a configuration bundle may be a third-party manufacturer of configuration bundles who did not manufacture the client device FIG. 2 is a data flow diagram illustrating an exemplary method for configuring a client device. The method of FIG. 2 includes receiving (502), at a vendor (102), user provided configuration parameters (212) for the client device (120) from a user (210). Although a vendor is generally a business organization, a vendor (102) as depicted in FIG. 2 comprises particularly a vendor's automated computing machinery upon which is carried out processing steps in methods for configuring client devices according to embodiments of the present invention.

User provided configuration parameters (212) typically include configuration parameters known or available to the user (134) that concern the user's services gateway, network, or other configuration parameters that define the context in which the client device (120) will operate. Examples of user provided configuration parameters (212) include a user's LAN mask, a user's IP default gateway address, a user's IP address, a user's LAN name, a user's DMS name, a users link type (Ethernet, Bluetooth, 802.11), wireless network name, wireless encryption key, or any other user provided configuration parameters that will occur to those of skill in the art.

The method of FIG. 2 includes receiving (504), at the vendor (102), a configuration bundle (122) for the client device (120) from a manufacturer (132). The manufacturer (132) is a manufacturer of the configuration bundle (122) for the client device (120). In many examples according to the present invention, the manufacturer (132) of the configuration bundle (122) is the manufacturer of the client device (120). However, in other examples, the manufacturer (132) of the configuration bundle may not manufacture the client device (120).

In the example of FIG. 2, the configuration bundle (122) includes services, computer code, and other resources for configuring the client device (120) in accordance with methods of the present invention. In some cases, the configuration bundle (122) includes a driver for the client device (120). In some examples of configuring a client device according to methods of the present invention, the configuration bundle (122) is an OSGi bundle including services for configuring the client device. The OSGi configuration bundle is executed on an OSGi services gateway to configure the client device. Because the configuration bundle (122) is designed to configure a specific client device (120), in many examples, various configuration bundles (122) have various designs according to the client device the configuration bundle is designed to configure, the network on which the client device (120) will operate, the services gateway to which the configuration bundle (122) will be deployed and executed, or any other factor that will occur to those of skill in the art.

In some examples of the method of FIG. 2, receiving (504), at the vendor (102), a configuration bundle (122) for the client device (120) from a manufacturer (132) includes individually downloading the configuration bundle (122) from, for example, a manufacturer's website. Alternatively, receiving (504), at the vendor (102), a configuration bundle (122) for the client device (120) from a manufacturer (132) includes receiving configuration bundles as a complete database of configuration bundles indexed, for example, by make, model, or client device serial number. In many cases, the database is stored on a compact disc, or other form of non-volatile computer memory. Receiving (504), at the vendor (102), a configuration bundle (122) for the client device (120) from a manufacturer (132) includes receiving updates to configuration bundles (122) previously received at the vendor (102).

In some embodiments of the present invention, some additional configuration parameters are such as a client device identifier are made known to the vendor by the purchase of the client device. That is, parameters such as serial number, make and model of the client device are available to the vendor (102) at the point of sale, and therefore, the vendor may not receive these configuration parameters from the user.

The method of FIG. 2 includes associating (506) the user provided configuration parameters (212) for the client device (120) with the configuration bundle (122) for the client device (120). Associating (506) the user provided configuration parameters (212) with the configuration bundle (122) results in an associated configuration bundle (216). An associated configuration bundle (216) is a configuration bundle having the appropriate configuration parameters such that when deployed to the user's services gateway, and when executed, the associated configuration bundle configures the client device.

When the user provided configuration parameters (212) and have been associated with the configuration bundle (122), the associated configuration bundle is ready for deployment to the user's services gateway. In many cases, more than one configuration bundle are associated to create a complete set of associated configuration bundles, such that when the set of configuration bundles are deployed onto the user's services gateway and executed, the user's client device is configured.

In the method of FIG. 2, associating (506) the user provided configuration parameters (212) with the configuration bundle (122) for the client device (120) is carried out by the vendor (102). In one example, the vendor (102) receives the user provided configuration parameters (212) at the point of sale and receives a configuration bundle (122) from a manufacturer (132). The vendor associates the user provided configuration parameters (212) with the configuration bundle (122), thereby creating an associated configuration bundle (216) for the user.

Consider an example of a vendor (102) operating a website. A user (210) purchases a client device (120) from the vendor (102) through the vendor's website. During the purchase, a vendor's (102) website includes a series of screens requesting user provided configuration parameters (212). Upon completion of the purchase, the vendor (102) receives (504) a configuration bundle (122) from a manufacturer (132) or retrieves a configuration bundle from a database of configuration bundles already received from the manufacturer (134). The vendor (102) associates the user provided configuration parameters with the configuration bundle (122).

The method of FIG. 2 includes downloading (218) the associated configuration bundle (216) for the client device (120) to a services gateway (130) for the user. In the method of FIG. 2, downloading (218) the associated configuration bundle (216) for the client device (120) to a services gateway (130) for the user includes pushing (510) the associated configuration bundle to the services gateway (130) for the user. 'Pushing' means that the vendor, knowing the WAN network address of a services gateway for a user and being authorized to do so, originates a download of an associated configuration bundle on the vendor's own motion, without waiting for a specific request from a user for the download. When a vendor pushes (510) an associated configuration bundle (216) onto a services gateway (130), the associated configuration bundle (216) is ready for execution on the user's services gateway (130) when the user is ready to install the client device (120). That is, no further action is required on the part of the user other than plugging the client device into a configuration port on a services gateway.

More particularly, in such embodiments, for example, a user purchases a client device from a vendor who prepares an associated configuration bundle for the client device and pushes the associated bundle to the user's services gateway either while the user is still at the vendor's point of sale or while the user is driving home. When the user arrives at home, the associated configuration bundle is already installed and activiated on the user's home services gateway. The user plugs the client device into a configuration port on the user's services gateway and configuration services from the associated configuration bundle configure the client device.

As alternatives to pushing, the associated configuration bundle is downloaded to a DMS and the DMS stores the associated configuration bundle (216), or the associated configuration bundle is stored at the vendor, until a user or a user's services gateway (130) requests the associated configuration bundle (216). In some examples, the user's services gateway requests the associated configuration bundle when the services gateway detects that the client device (120) is connected to the services gateway (130).

The method of FIG. 2 includes executing (512) the associated configuration bundle (216). Executing (512) the associated configuration results in a configured client device (222). In many cases, the configuration bundle is executed when the client device is detected on the services gateway. That is, a configuration service in the configuration bundle polls a configuration port on the services gateway and, when it detects the presence of a client device, the service is programmed to proceed with configuration at that time. Methods of detecting a client device on a configuration port of a services gateway are described in more detail below. In other examples, executing (512) the associated configuration bundle (216) includes receiving an instruction from the user to execute the configuration bundle. Using a web browser installed on a computer connected to the services gateway, a user may through a series of instruction screens instruct the services gateway to execute the associated configuration bundle. In many embodiments, a services gateway according to the present invention has installed directly upon it no user interface hardware, no terminal screen, no keyboard, no mouse, although such services gateways do often support HTTP interfaces to services on the gateway. In such embodiments, a user can access HTTP screens on the gateway by logging on to a browser on a personal computer or other client device that does support user interface hardware and is coupled to the gateway through a LAN and directing the browser to the services gateway's IP address on the LAN.

Figure 3:
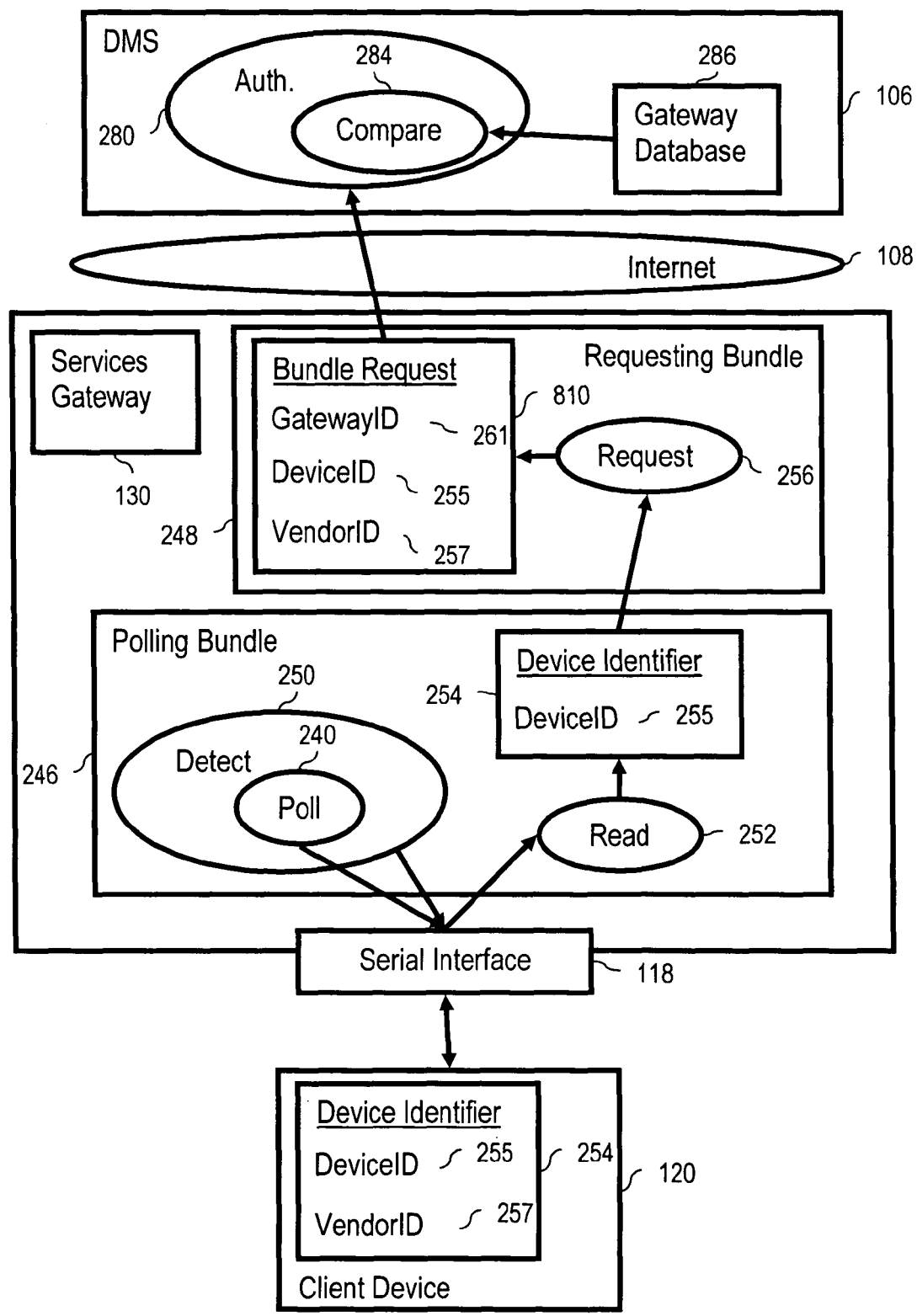
FIG. 3 is a dataflow diagram illustrating an exemplary method of detecting a client device and requesting an associated configuration bundle.

FIG. 3 is a data flow diagram illustrating an exemplary method of detecting (250) a client device (120) and requesting (242) an associated configuration bundle (242) for the client device (120). In the method of FIG. 3, detecting a client device (120) includes polling (240) a serial interface (118) for the connection of a client device (120). Polling (240) a serial interface (118) means periodically checking the serial interface for the connection of a device.

In the method of FIG. 3, detecting (250) a client device (250) is carried out through a polling bundle (246). In some example embodiments, the polling bundle (246) is an OSGi bundle. An OSGi framework provides standard services in the DAS for checking for the connection of devices on the services gateway (130). In some examples, the polling bundle (246) includes specifically programmed polling services within the bundle. In alternative examples, the polling bundles queries a services registry on an OSGi framework operating on the services gateway to identify standard OSGi services for checking for the connection of a device on the services gateway. In the example of FIG. 3, the polling bundle (246) uses the OSGi standard services to poll (240) the serial interface (118) and detect the client device (120).

The method of FIG. 3 includes reading (252) a client device identifier (254) from the client device (120) when polling detects a client device connected to a serial interface. A client device identifier (254) is any identification that sufficiently identifies the client device such that an appropriate configuration bundle for the client device may be obtained and executed. Exemplary client device identifiers include manufacturer name, model name, serial number, or any other client device identifier as will occur to those of skill in the art.

The client device identifier may be represented in data by a record such as the client device identifier record (254) of FIG. 3. The client device identifier record (254) is stored in non-volatile memory on the client device (120). The client device identifier record (254) includes a deviceID field (255) representing a serial number, make and model, or any other identification of the device that will occur to those of skill in the art. The device identifier record (254) of FIG. 3 also includes a vendorID field (257) identifying the vendor (102) of the client device. In some examples, a vendor may place a unique identifier in the vendorID field of the client device before selling the client device or the manufacturer many identify the vendor by vendorID before shipping the client device to the vendor.

In method of FIG. 3, a polling bundle (246) carries out reading (252) a client device identifier (254) from the client device (120). In some example embodiments, the polling bundle (246) is an OSGi bundle. An OSGi framework provides standard services in a DAS for reading device identifiers from a device connected to the services gateway. In some exemplary methods of detecting client devices and requesting configuration bundles, a polling bundle (246) includes specifically programmed services within the bundle to read the client device identifier. In alternative examples, the polling bundle queries a services registry on an OSGi framework operating on the services gateway to identify standard OSGi services for reading a client device identifier. In such embodiments, the polling bundle (246) then uses the OSGi standard services to read a client device identifier from the client device.

A DAS in an OSGi framework often also provides standard services to identify and install a driver for the client device. In embodiments that utilize such DAS services, when a polling bundle (246) detects a client device (120) and identifies the client device (120), the polling bundle queries the service registry on the service framework of the services gateway to identify standard services to obtain and install a driver to facilitate communication between the services gateway and the client device.

In some exemplary methods of detecting client devices and requesting configuration bundles, the associated configuration bundle for the client device is pushed onto the services gateway (120) for the user. In such exemplary embodiments, requesting (256) the associated configuration bundle includes requesting the associated configuration bundle stored within the services gateway. In other exemplary embodiments, where the associated configuration bundle is not pushed onto the services gateway (130), requesting (256) an associated configuration bundle includes requesting the associated configuration bundle from a DMS.

A request for an associated configuration bundle can be represented in data as a record such as, for example, the bundle request record (810) of FIG. 3. The bundle request record (810) includes a deviceID field (255) identifying the client device to be configured. The bundle request record (810) also includes a gatewayID field (261) identifying the gateway requesting the associated configuration bundle. The bundle request record (810) of FIG. 3 includes a vendorID field (257) identifying the vendor (102) of the client device (120). In some examples, the gatewayID and the DeviceID together uniquely identify the associated configuration bundle for the device. In other example, the bundle request record includes a userID identifying the user.

Requesting (256) an associated configuration bundle, in many embodiment of the present invention, is carried out by a requesting bundle, such as the requesting bundle (242) of FIG. 3. In some exemplary embodiments according to the present invention, the requesting bundle (242) is an OSGi bundle including services capable of sending a request for an associated configuration bundle to a DMS. The OSGi framework provides a standard HTTP service. In some examples, a requesting bundle (242) sends a bundle request to the DMS as a HTML document in an HTTP message.

The method of FIG. 3 includes authenticating (28) the services gateway (130). Authenticating the gateway can be carried out, for example, by comparing (284) the gatewayID field (261) of the bundle request record (810) with a gateway database (286). In the method of FIG. 3, authenticating (280) the services gateway (130) is carried out by a DMS. The DMS authenticates the services gateway by comparing the services gateway identifier with a database of gateway identifiers registered with the DMS. When the services gateway is authenticated, the method of FIG. 3 includes retrieving the associated configuration bundle stored on the DMS. The DMS downloads the associated configuration bundle to the services gateway for execution.

When the services gateway is authenticated, the DMS identifies the associated configuration bundle for the client device stored on the DMS. The DMS identifies an associated configuration bundle for the client device in dependence upon the deviceID field (255) and the gatewayID field (261) of the bundle request record (810). The DMS downloads the identified associated configuration bundle to the services gateway for execution. Alternatively, the DMS requests the associated configuration bundle from a vendor identified by the vendorID field of the bundle request record (810).

Figure 4:
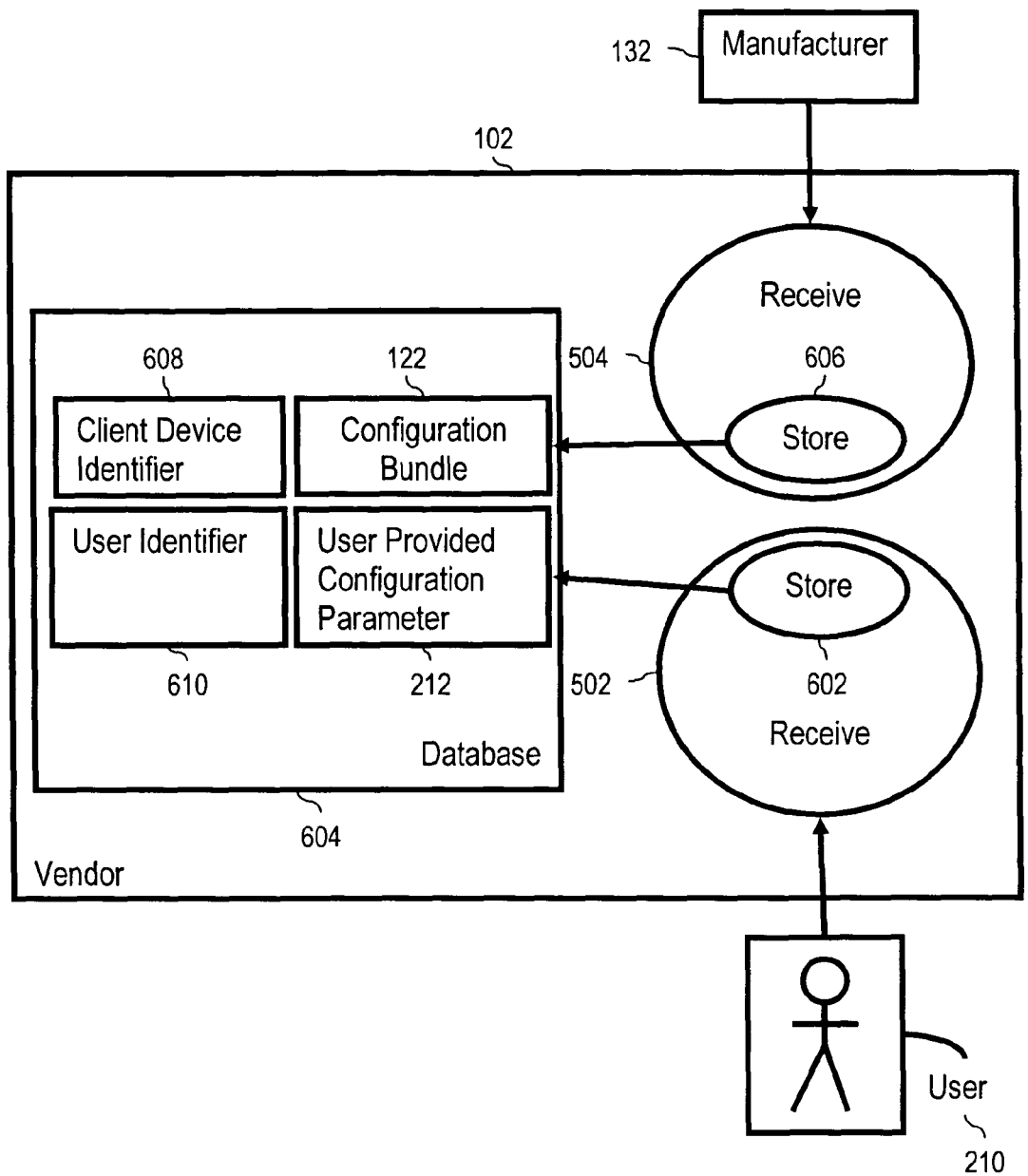
FIG. 4 is a dataflow diagram illustrating an exemplary method of receiving, from a manufacturer, a configuration bundle and receiving, from a user, user provided configuration parameters.

FIG. 4 is a dataflow diagram illustrating a method of receiving (502), at a vendor (102), user provided configuration parameters (212) for the client device (120) and receiving (504), at the vendor (102), a configuration bundle (122) for the client device (120) from a manufacturer (132). In the method of FIG. 4, receiving (502), at a vendor (102), user provided configuration parameters (212) for the client device (120) includes storing (602) the user provided configuration parameters (212) in a database (604).

By storing (602) user provided configuration parameters (212) the vendor (102) provides an additional service to the user. The user provides the user provided configuration parameters (212) one time to the vendor (102). The vendor automates the configuration for a user reducing the user's involvement in configuration with each additional client device (120) the user purchases from the vendor. In this way, a user is encouraged to continue shopping with the vendor (102), because configuring client devices (102) proceeds automatically for each client device purchased after the vendor received the user provided configuration parameters (212).

In the method of FIG. 4, receiving (504), at the vendor (102), a configuration bundle (122) for the client device (120) from a manufacturer (132) includes storing (606) the configuration bundle (122) in a database (604). The database (604) of FIG. 4 is indexed according to a client device identifier (608). A vendor (102) receives (504) the configuration bundle from the manufacturer (132) and stores (606) the configuration bundles in a database (604).

In one example, a vendor (102) receives configuration bundles from many manufacturers regardless the user's purchases. The vendor (102) maintains a current database of all the configuration bundles for all the manufacturers whose products the vendor (102) sells. When the vendor (102) sells the client device, a configuration bundle (122) for the client device is available in the vendor's database (604) for purchase, or for the vendor (102) to provide as an additional customer service.

In the database (604) of FIG. 4, the configuration bundles (122) are indexed according to client device identifier (608). Examples of client device identifiers (608) include manufacturer name and model number, serial number or any other client device identifier that will occur to those of skill in the art. By indexing the database (604) by client device identifier (608) the vendor (102) can retrieve the appropriate configuration bundle for the client device when the user purchases the client device.

Figure 5:
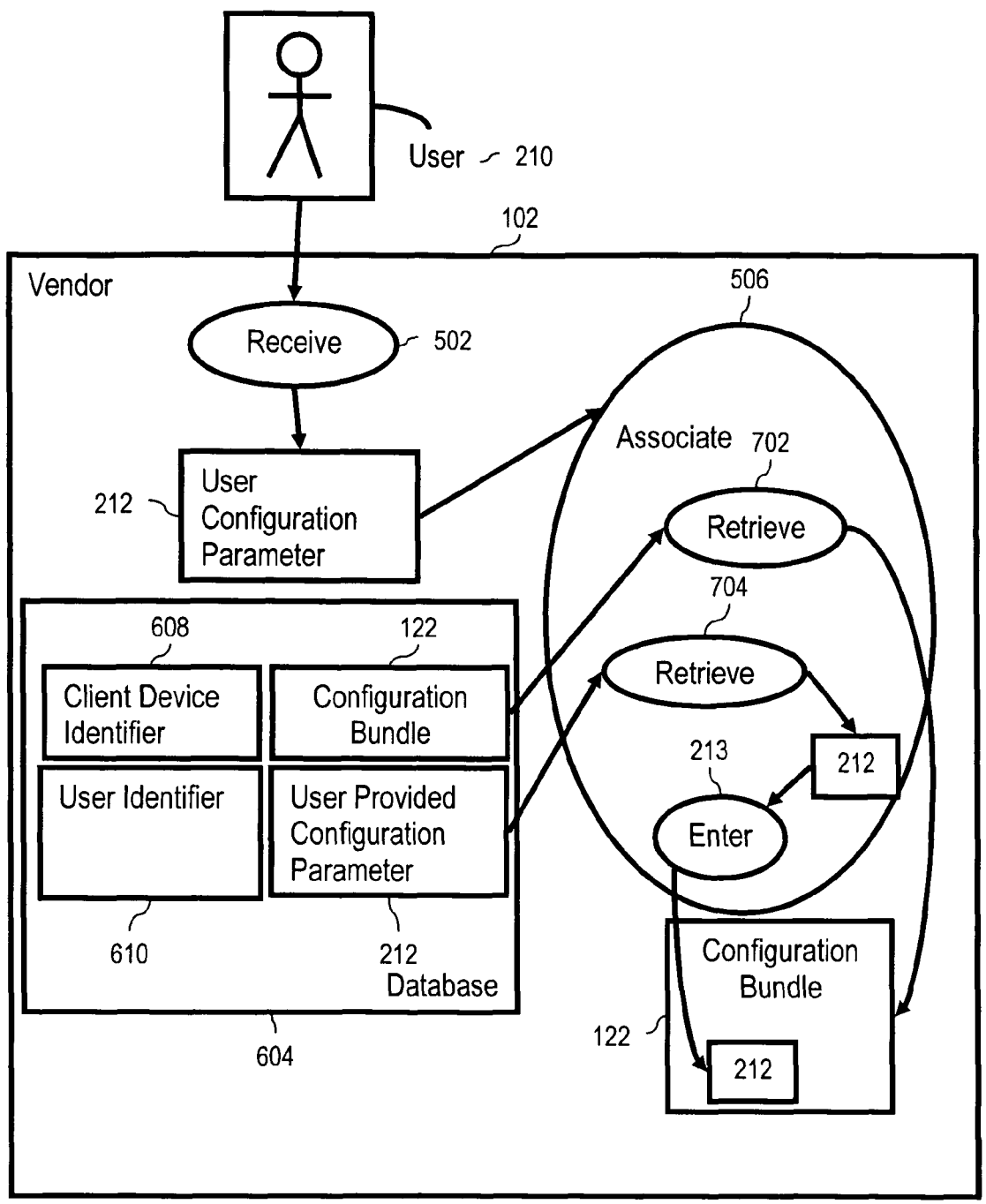
FIG. 5 is a dataflow diagram illustrating an exemplary method of associating the user provided configuration parameters with the configuration bundle for the client device.

FIG. 5 is a dataflow diagram illustrating an exemplary method of associating user provided configuration parameters with the configuration bundle (122). In the method of FIG. 5 associating (506) the user provided configuration parameters (212) for the client device (120) with the configuration bundle (122) for the client device (120) includes retrieving (702) the configuration bundle (122) from a database (604) in dependence upon a client device identifier (608). When the vendor (102) sells the client device (120) to the user, the vendor (102) retrieves (702) the appropriate configuration bundle (122) from the vendor's database (604).

If the user (210) is a previous customer of the vendor (102), the vendor may have user provided configuration parameters (212) for the user stored in the vendor's database. In the method of FIG. 5, associating (506) the user provided configuration parameters (212) for the client device (120) with the configuration bundle (122) for the client device (120) includes retrieving (704) user provided configuration parameters (212) from a database (604) in dependence upon a user identifier (610) and entering (213) the user provided configuration parameters into the configuration bundle (122).

In the method of FIG. 5, associating (506) user provided configuration parameters (212) with the configuration bundle (122) includes entering (213) the user provided configuration parameters (212) into the configuration bundle retrieved from the vendor's database (604). In one example, entering (213) the user provided configuration parameters (212) into the configuration bundle received from the manufacturer (134) is carried out through a website run by the vendor (102). When a user purchases a client device (120) through the vendor's website, the vendor's website provides screens prompting the user to input user provided configuration parameters. The vendor (102) receives the user provided configuration parameters through the web site and the vendor (102) enters the user provided configuration parameters (212) into the configuration bundle (122). Alternatively, the associated configuration bundle is then downloaded to the user's services gateway, downloaded to a DMS, or stored at the vendor (102).

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for configuring a client device, the method comprising the steps of:
   receiving, at a vendor, user provided configuration parameters for the client device from a user, the configuration parameters specifying a services gateway for the client device;
   receiving, at the vendor, a configuration bundle for the client device from a manufacturer, the configuration bundle comprising a service bundle executable in the services gateway; and
   associating the user provided configuration parameters for the client device with the configuration bundle for the client device; thereby producing an associated configuration bundle.

2. The method of claim 1 further comprising downloading the associated configuration bundle for the client device to a services gateway for the user.

3. The method of claim 2, wherein downloading the associated configuration bundle for the client device to a services gateway for the user comprises pushing the associated configuration bundle to the services gateway for the user.

4. The method of claim 1 further comprising executing the associated configuration bundle.

5. The method of claim 1 comprising detecting a client device.

6. The method of claim 5 comprising requesting an associated configuration bundle for the client device.

7. The method of claim 1 wherein receiving, at a vendor, user provided configuration parameters for the client device from a user comprises storing the user provided configuration parameters in a database.

8. The method of claim 1 wherein receiving, at the vendor, a configuration bundle for the client device from a manufacturer comprises storing the configuration bundle in a database.

9. The method of claim 8, wherein the database is indexed according to a client device identifier.

10. The method of claim 1 wherein associating the user provided configuration parameters for the client device with the configuration bundle for the client device comprises retrieving the configuration bundle from a database in dependence upon a client device identifier.

11. The method of claim 1 wherein associating the user provided configuration parameters for the client device with the configuration bundle for the client device comprises retrieving user provided configuration parameters from a database in dependence upon a user identifier.

12. A system for configuring a client device, the system comprising:
   means for receiving, at a vendor, user provided configuration parameters for the client device from a user, the configuration parameters specifying a services gateway for the client device;
   means for receiving, at the vendor, a configuration bundle for the client device from a manufacturer, the configuration bundle comprising a service bundle executable in the services gateway; and
   means for associating the user provided configuration parameters for the client device with the configuration bundle for the client device; thereby producing an associated configuration bundle.

13. The system of claim 12 further comprising means for downloading the associated configuration bundle for the client device to a services gateway for the user.

14. The system of claim 13, wherein means for downloading the associated configuration bundle for the client device to a services gateway for the user comprises means for pushing the associated configuration bundle to the services gateway for the user.

15. The system of claim 12 further comprising means for executing the associated configuration bundle.

16. The system of claim 12 comprising means for detecting a client device.

17. The system of claim 16 comprising means for requesting an associated configuration bundle for the client device.

18. The system of claim 12 wherein means for receiving at a vendor, user provided configuration parameters for the client device from a user comprises means for storing the user provided configuration parameters in a database.

19. The system of claim 12 wherein means for receiving, at the vendor, a configuration bundle for the client device from a manufacturer comprises means for storing the configuration bundle in a database.

20. The system of claim 19, wherein the database is indexed according to a client device identifier.

21. The system of claim 12 wherein means for associating the user provided configuration parameters for the client device with the configuration bundle for the client device comprises means for retrieving the configuration bundle from a database in dependence upon a client device identifier.

22. The system of claim 12 wherein means for associating the user provided configuration parameters for the client device with the configuration bundle for the client device comprises means for retrieving user provided configuration parameters from a database in dependence upon a user identifier.

23. A computer program product for configuring a client device, the computer program product comprising:
   a recording medium;
   means, recorded on the recording medium, for receiving, at a vendor, user provided configuration parameters for the client device from a user, the configuration parameters specifying a services gateway for the client device;
   means, recorded on the recording medium, for receiving, at the vendor, a configuration bundle for the client device from a manufacturer, the configuration bundle comprising a service bundle executable in the services gateway; and
   means, recorded on the recording medium, for associating the user provided configuration parameters for the client device with the configuration bundle for the client device; thereby producing an associated configuration bundle.

24. The computer program product of claim 23 further comprising means, recorded on the recording medium, for downloading the associated configuration bundle for the client device to a services gateway for the user.

25. The computer program product of claim 24, wherein means, recorded on the recording medium, for downloading the associated configuration bundle for the client device to a services gateway for the user comprises means, recorded on the recording medium, for pushing the associated configuration bundle to the services gateway for the user.

26. The computer program product of claim 23 further comprising means, recorded on the recording medium, for executing the associated configuration bundle.

27. The computer program product of claim 23 comprising means, recorded on the recording medium, for detecting a client device.

28. The computer program product of claim 27 comprising means, recorded on the recording medium, for requesting an associated configuration bundle for the client device.

29. The computer program product of claim 23 wherein means, recorded on the recording medium, for receiving, at a vendor, user provided configuration parameters for the client device from a user comprises means, recorded on the recording medium, for storing the user provided configuration parameters in a database.

30. The computer program product of claim 23 wherein means, recorded on the recording medium, for receiving, at the vendor, a configuration bundle for the client device from a manufacturer comprises means, recorded on the recording medium, for storing the configuration bundle in a database.

31. The computer program product of claim 30, wherein the database is indexed according to a client device identifier.

32. The computer program product of claim 23 wherein means, recorded on the recording medium, for associating the user provided configuration parameters for the client device with the configuration bundle for the client device comprises means, recorded on the recording medium, for retrieving the configuration bundle from a database in dependence upon a client device identifier.

33. The computer program product of claim 23 wherein means, recorded on the recording medium, for associating the user provided configuration parameters for the client device with the configuration bundle for the client device comprises means, recorded on the recording medium, for retrieving user provided configuration parameters from a database in dependence upon a user identifier.

* * * * *